No. 855,863. PATENTED JUNE 4, 1907.
V. C. ORANGE & F. M. BOWERS.
AIR BRAKE LOCKING DEVICE.
APPLICATION FILED JAN. 26, 1906.
2 SHEETS—SHEET 2.
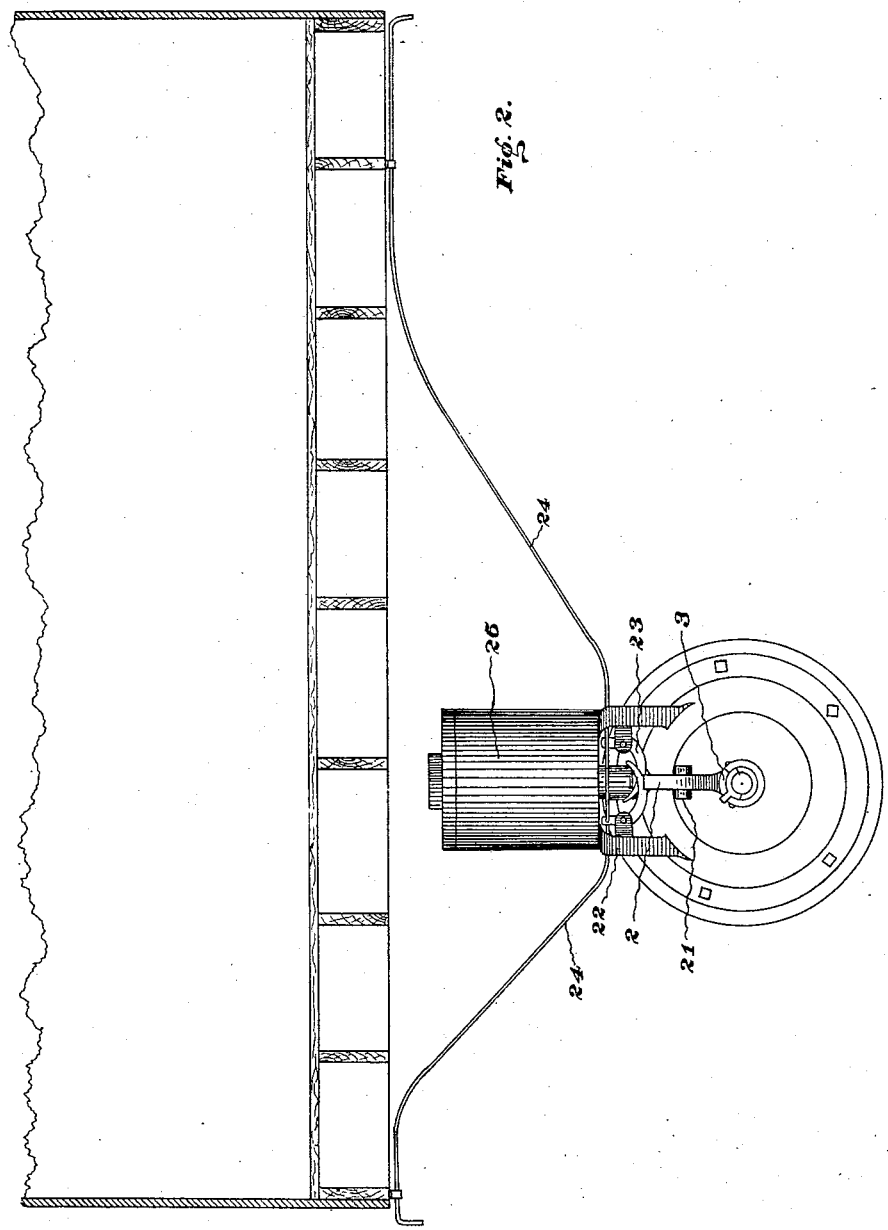

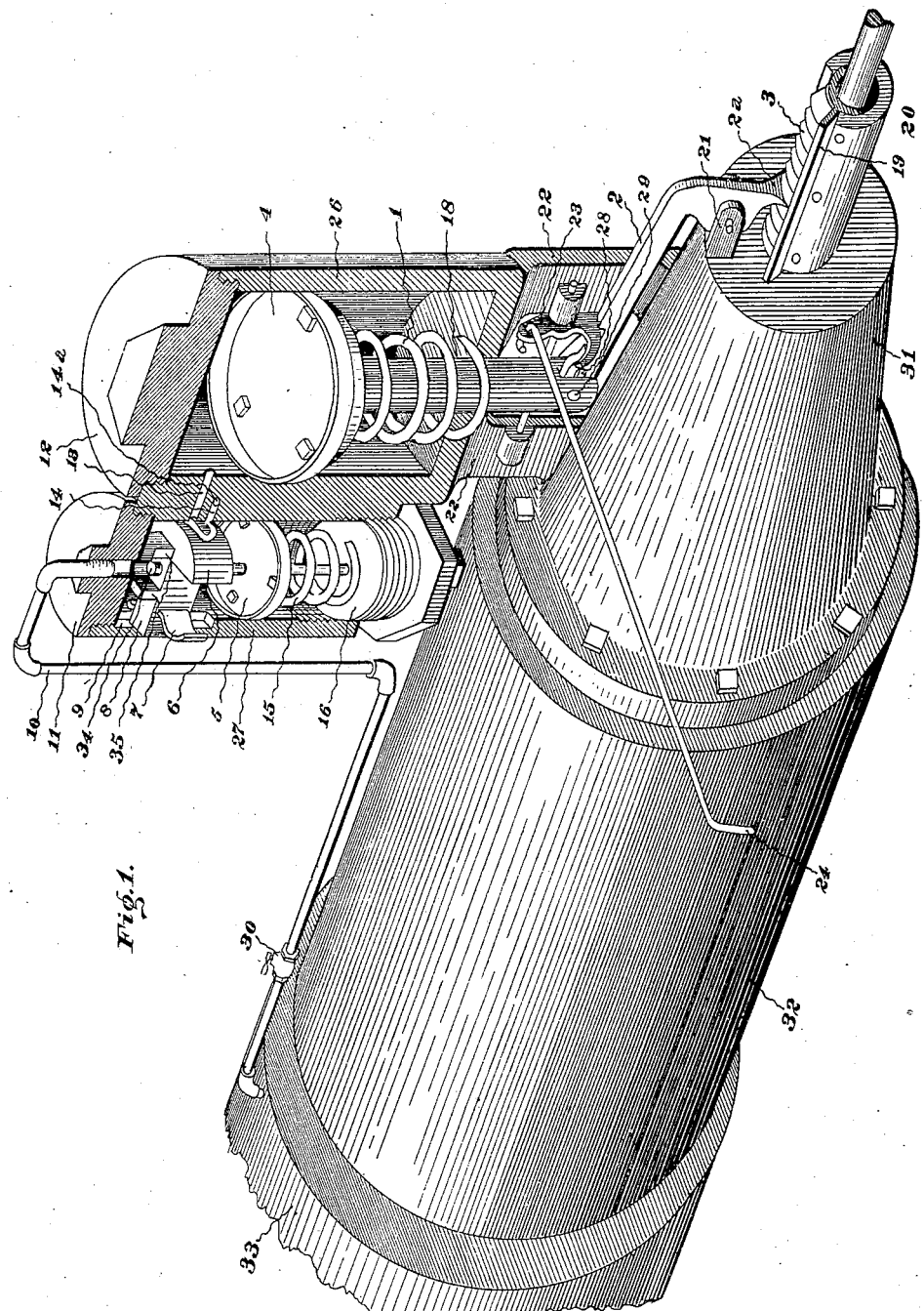

UNITED STATES PATENT OFFICE.

VERNE C. ORANGE AND FRED M. BOWERS, OF PUEBLO, COLORADO.

AIR-BRAKE-LOCKING DEVICE.

No. 855,863.        Specification of Letters Patent.        Patented June 4, 1907.

Application filed January 26, 1906. Serial No. 297,995.

*To all whom it may concern:*

Be it known that we, VERNE C. ORANGE and FRED M. BOWERS, citizens of the United States, residing at Pueblo, in the county of Pueblo and State of Colorado, have invented certain new and useful Improvements in Air-Brake-Locking Devices; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

Our invention relates to improvements in air brake locking devices in which a spring actuated lever with a dog formed thereon engages a suitable notched rack attachable to the push rod of the air brake or attachable to the pipe surrounding the push rod, the releasing of which is dependent upon air pressure or rods extending to both sides of the car upon which it is mounted, and the objects of our invention are, first; to provide a simple locking device to retain an air brake in locked position independent of air pressure but that is directly dependent upon air pressure to release it in such manner that it will not release unless the air pressure is up to a required standard, and to also supply a means of releasing the locking device independent of air by rods from both sides of the car, and second: to supply a locking device for air brakes that is adjustable to any desired standard of pressure for its releasing operation. We attain these objects by the mechanisms illustrated in the accompanying drawings, in which Figure 1 is a perspective view of an air brake cylinder with a portion of the auxiliary reservoir in broken section and the non-air head with our locking and releasing device mounted thereon, showing the same in locked position with the air brake set, and, Fig. 2 is a cross section of a freight car under which is mounted our locking device on an air brake, showing manner of releasing same by means of rods from both sides of the car.

Similar numbers refer to similar parts throughout the several views.

To attach our improvement it is necessary to cut away a portion of pipe 20 and fit the rack 3 thereto, riveting securely, the tongue 19 being supplied to enter a groove in the non-air head to prevent the rack from turning from the desired relation to dog 2ª of lever 2.

The rack 3 may be riveted to the push rod of an air brake that does not have pipe 20. The lugs 21 may be cast solid on the non-air head or be properly formed to it and bolted thereon so the fulcrum in through them and lever 2 holds a proper relation to rack 3, the cylinders 26 and 27 may also be cast solid to non-air head 31 or the legs 22 may be formed to fit its outer surface and be bolted thereto.

The locking lever 2 being connected by a fulcrum pin in lugs 21 and having an elongated hole 28 so made for freedom of movement about pin 29, is connected by the latter to piston rod 18 which has attached solidly to it the air piston, of a well known type, 4, with locking spring 1 between piston 4 and the lower end of the cylinder 26 the upper end of said cylinder is connected by port 13 to cylinder 27, the said port being of sufficient size to permit the air to quickly fill or escape from cylinder 26. In cylinder 27 is mounted the release valve 6 and piston 51 together with the tension spring 15, the said valve which is held to its seat by a spring 7 and is also held from turning off its seat by the squared end 8 in slot 9 is, together with piston 5, rigidly attached to rod 34 which extends into a hole through the stem 16 to keep it in a central position to the piston 5, the said valve 6 may move upwardly until the elements 35 engage the head 11 and may move downward till the squared end 8 reaches the bottom of slot 9 which is so cut as to allow valve 6 to pass down far enough to open port 13, the elements 34 permitting the said valve to move upward till port 13 is opposite the proper port in the valve to connect an air passage through port 13, the valve port, and port 14 to the hole 14ª which leads to the open air.

The air pressure for operating the release piston and valve is secured from the auxiliary reservoir through pipe 10 which is connected to head 11 and through this pipe the same pressure that is in the auxiliary reservoir 33 is admitted to cylinder 27 and the spring 15 being set so said air pressure will compress it till valve 6 is down and port 13 is open the same pressure will enter cylinder 26 between head 12 and piston 4 and compress piston 4 against spring 1 which is of much lower tension, till lever 2 releases dog 2ª from engagement with the teeth of rack 3.

When the air brake is being set a portion of the air from auxiliary reservoir 33 is transferred to the brake cylinder 32 and thereby reduces the pressure in the auxiliary reservoir and cylinder 27 till spring 15 will raise valve 6 to the position shown in Fig. 1 whereupon the pressure in cylinder 26 is released through ports 13, 14 14$^a$ and spring 1 immediately raises piston 4 rod 18 and lever 2 till dog 2$^a$ engages the teeth in rack 3, when if the air in the brake cylinder were permitted to escape the dog 2$^a$, would hold the brake in locked position. To release the dog 2$^a$, by air pressure it is now necessary to pump up the pressure in the auxiliary reservoir until the spring 15 will be compressed by piston 5 and port 13 opened whereupon the pressure entering cylinder 26 will release the dog 2$^a$ and hold it so released till the operation of draining the auxiliary reservoir to apply the air brake is repeated.

For the reason that cars are frequently left standing in a railroad yard with the brakes set it is necessary to supply a release other than by air which we have supplied by cams 23, one on each side of the lever 2, that serve to release dog 2$^a$ by pulling either rod 24 from the side of the car. The rods 24 being attached to cams 23 so a pull on either of them will press cam 23 down on lever 2, effecting the release thereof.

The valve 30 serves to cut off pressure in pipe 10.

Having thus described our invention what we do claim and desire to secure by Letters Patent is:—

1. In combination with a reservoir and brake cylinder, of an air brake and its push rod, means carried by the brake cylinder locking the push rod against movement said means being made operative by a decrease of pressure within the reservoir.

2. In combination with a reservoir and brake cylinder, of an air brake and its push rod, means carried by the brake cylinder locking the push rod against movement, said means being made operative by a decrease of pressure within the reservoir, and means for releasing the lock on the push rod.

3. In combination with a brake cylinder, an air brake and its push rod, and spring means carried by the brake cylinder normally locking the push rod against movement.

4. In combination with a brake cylinder of an air brake and its push rod, spring means carried by the brake cylinder for locking the push rod against movement, and means for overcoming the tension of the spring locking means for releasing the push rod.

5. The combination with a brake cylinder of an air brake and its push rod, a removable rack acting in conjunction with the push rod, and means carried by the brake cylinder engaging the rack for locking the push rod against movement.

6. The combination with a brake cylinder of an air brake and its push rod, a rack acting in conjunction with the push rod, means carried by the brake cylinder engaging the rack for locking the push rod against movement, and means carried by the rack acting in conjunction with the brake cylinder for holding the rack against displacement.

7. In combination with a brake cylinder of an air brake and its push rod, a rack acting in conjunction with the push rod, means carried by the brake cylinder engaging the rack for locking the push rod against movement, and a tongue on the rack passing through a groove in the brake cylinder for holding the rack against displacement.

8. The combination with a brake cylinder of an air brake and its push rod, a removable rack acting in conjunction with the push rod, and a lever pivoted to the brake cylinder engaging the rack for holding the push rod against movement.

9. The combination with a brake cylinder of an air brake and its push rod, a removable rack acting in conjunction with the push rod, a lever pivoted intermediate its length to the brake cylinder, one end of the lever being adapted to engage the rack for holding the push rod against movement, and means engaging the opposite end portion of the lever for oscillating the same.

10. The combination with a reservoir and brake cylinder of an air brake and its push rod, an oscillating means carried by the brake cylinder for holding the push rod against movement said means being made operative by a decrease of pressure within the reservoir.

11. In combination with the brake cylinder of an air brake and its push rod, spring means carried by the brake cylinder for locking the push rod against movement, and a fluid means for overcoming the tension of the spring locking means for releasing the push rod.

12. In combination with the brake cylinder of an air brake and its push rod, spring means carried by the brake cylinder for locking the push rod against movement, a fluid means for overcoming the tension of the spring locking means for releasing the push rod, and mechanism for controlling the fluid means.

13. In combination with the brake cylinder of an air brake and its push rod, a cylinder carried by the brake cylinder, a piston within the cylinder, a rod for the piston, means carried by the brake cylinder for engaging the push rod, said means being connected to the piston rod, a spring within the cylinder bearing against the piston to hold said locking means in engagement with the push rod, and means for operating the piston against the action of the spring.

14. In combination with the reservoir and the brake cylinder of an air brake and its push rod, a cylinder, means for engaging the push rod, said means being operative within the cylinder, a second cylinder in communication with the first named cylinder, and connections between the second named cylinder and the reservoir, a means within the second named cylinder for controlling the communication between the two cylinders.

15. In combination with the reservoir and the brake cylinder of an air brake and its push rod, a cylinder, means for engaging the push rod, said means being operative within the cylinder, a second cylinder in communication with the first named cylinder, connections between the second named cylinder and the reservoir, means within the second named cylinder for controlling the communication between the two cylinders, and putting one of the cylinders in communication with the atmosphere.

16. In combination with the reservoir and the brake cylinder of an air brake and its push rod, a cylinder, means for engaging the push rod, said means being operative within the cylinder, a second cylinder in communication with the first named cylinder, connections between the second named cylinder and the reservoir, a valve slidable in the second named cylinder and means for imparting movement to the valve.

17. In combination with the reservoir and the brake cylinder of an air brake and its push rod, a cylinder, means for engaging the push rod, said means being operative within the cylinder, a second cylinder in communication with the first named cylinder, connections between the second named cylinder and the reservoir, a valve slidable in the second named cylinder, means for imparting movement to the valve, and guiding means for the valve.

18. In combination with the reservoir and the brake cylinder of an air brake and its push rod, a cylinder, means for engaging the push rod, said means being operative within the cylinder, a second cylinder in communication with the first named cylinder, connections between the second named cylinder and the reservoir, a valve slidable in the second named cylinder, means for imparting movement to the valve, and means for limiting the movement of the valve.

19. In combination with the reservoir and the brake cylinder of an air brake and its push rod, a cylinder, means for engaging the push rod, said means being operative within the cylinder, a second cylinder in communication with the first named cylinder, connections between the second named cylinder and the reservoir a valve slidable in the second named cylinder, means for imparting movement to the valve, and means for both guiding the valve and limiting the movement thereof.

20. In combination with the brake cylinder of an air brake and its push rod, a cylinder, means for engaging the push rod, said means being operative within the said cylinder, a second cylinder in communication with the first named cylinder, a valve slidable in the second named cylinder, fluid means for imparting movement to the valve in one direction, and means for imparting movement to the valve in an opposite direction.

21. In combination with the brake cylinder of an air brake and its push rod, a cylinder, means for engaging the push rod, said means being operative within the cylinder, a second cylinder in communication with the first named cylinder, a valve slidable in the first named cylinder, spring means for imparting movement to the valve in one direction, and means for imparting movement to the valve in an opposite direction.

22. In combination with the brake cylinder of an air brake and its push rod, a cylinder, means for engaging the push rod, said means being operative within the cylinder, a second cylinder in communication with the first named cylinder, a valve slidable in the second named cylinder, means for imparting movement to the valve, and means for giving the valve a movement at an angle to the first mentioned movement.

23. In combination with the brake cylinder of an air brake and its push rod, a cylinder, means for engaging the push rod, said means being operative within the cylinder, a second cylinder in communication with the first named cylinder, means for imparting movement to the valve, and a spring for giving the valve a movement at an angle to the first named movement.

24. In combination with the brake cylinder of an air brake and its push rod, a cylinder, means for engaging the push rod, said means being operative within the cylinder, a second cylinder in communication with the first named cylinder, a valve slidable in the second named cylinder and means for imparting movement to the valve, said cylinder being provided with a groove engaged by the valve.

25. In combination with the brake cylinder of an air brake and its push rod, a cylinder, means for engaging the push rod, said means being operative within the cylinder, a second cylinder in communication with the first named cylinder, a piston within the second named cylinder, a rod for the piston, a valve within the cylinder on the rod, and a spring engaging the piston to give movement thereto in one direction.

26. In combination with a reservoir and brake cylinder of an air brake and its push rod, means for locking the push rod against movement, said means being made operative by decrease of pressure within the reservoir.

27. In combination with the reservoir and brake cylinder of an air brake and its push rod, means for locking the push rod against movement, said means being made operative by a decrease of pressure within the reservoir and means for releasing the lock on the push rod.

28. The combination with the reservoir and brake cylinder of an air brake and its push rod, an oscillating means for normally holding the push rod against movement, said means being made operative by a decrease of pressure within the reservoir.

29. The combination with a brake cylinder of an air brake and its push rod, a rack acting in conjunction with the push rod, means engaging the rack for locking the push rod against movement, and means acting in conjunction with the brake cylinder for holding the rack against displacement.

30. In combination with a brake cylinder of an air brake and its push rod, a rack acting in conjunction with the push rod, means engaging the rack for locking the push rod against movement, and a tongue on the rack passing through a groove in the brake cylinder for holding the rack against displacement.

31. In combination with the brake cylinder of an air brake and its push rod and a fluid supplying means, means carried by the brake cylinder for locking the push rod against movement, said means being made operative by a decrease of pressure within the fluid supplying means, and means for releasing the lock on the push rod.

32. The combination with an air brake including an auxiliary reservoir and brake cylinder, of a locking cylinder having air communication with the auxiliary reservoir and provided with a piston and piston rod, a spring means engaging the piston and inclosed within the cylinder, and a locking device depending from the piston rod to engage and lock the brake cylinder rod against movement.

In testimony whereof, they affix their signatures, in presence of two witnesses.

VERNE C. ORANGE.
        FRED M. BOWERS.

Witnesses:
  GEO. L. WALKER,
  OTIS ROBINSON.